United States Patent [19]

Chernow et al.

[11] Patent Number: 4,999,806
[45] Date of Patent: Mar. 12, 1991

[54] SOFTWARE DISTRIBUTION SYSTEM

[76] Inventors: Fred Chernow, 360 Kiowa Pl., Boulder, Colo. 80303; Randy J. Peterson, 1330 Arapahoe St., Boulder, Colo. 80302

[21] Appl. No.: 93,321

[22] Filed: Sep. 4, 1987

[51] Int. Cl.⁵ .................... G06F 12/14; H04L 9/00
[52] U.S. Cl. .................... 364/900; 364/969.4; 364/918.5; 364/918.51; 380/4; 380/25
[58] Field of Search ... 364/200 MS File, 900 MS File; 380/4, 25

[56] References Cited

U.S. PATENT DOCUMENTS

| | | |
|---|---|---|
| 4,278,837 | 6/1981 | Best . |
| 4,306,289 | 12/1981 | Lumley . |
| 4,352,952 | 10/1982 | Boone et al. . |
| 4,446,519 | 5/1984 | Thomas . |
| 4,465,901 | 8/1984 | Best . |
| 4,471,163 | 9/1984 | Donald et al. ............... 364/200 |
| 4,525,599 | 6/1985 | Curran et al. . |
| 4,528,643 | 7/1985 | Freeny, Jr. . |
| 4,553,252 | 11/1985 | Egendorf . |
| 4,558,176 | 12/1985 | Arnold et al. . |
| 4,562,305 | 12/1985 | Gaffney, Jr. . |
| 4,562,306 | 12/1985 | Chou et al. . |
| 4,573,119 | 2/1986 | Westheimer et al. . |
| 4,593,353 | 6/1986 | Pickholtz . |
| 4,593,376 | 6/1986 | Volk ............... 364/900 |
| 4,598,170 | 7/1986 | Piosenka et al. . |
| 4,599,489 | 7/1986 | Cargile . |
| 4,609,777 | 9/1986 | Cargile . |
| 4,634,807 | 11/1987 | Chorley et al. . |
| 4,652,990 | 3/1987 | Pailen et al. ............... 364/200 |
| 4,654,799 | 3/1987 | Ogaki et al. ............... 364/900 |
| 4,658,093 | 4/1987 | Hellman ............... 380/25 |
| 4,672,554 | 6/1987 | Ogaki et al. ............... 364/900 |
| 4,674,055 | 6/1987 | Ogaki et al. ............... 364/900 |
| 4,677,565 | 6/1987 | Ogaki et al. ............... 364/479 |
| 4,740,890 | 4/1988 | William ............... 364/200 |
| 4,817,140 | 3/1989 | Chandra et al. ............... 380/4 |
| 4,864,494 | 9/1989 | Kobus, Jr. ............... 364/200 |

Primary Examiner—Allen R. MacDonald
Assistant Examiner—Debra A. Chun
Attorney, Agent, or Firm—Sughrue, Mion, Zinn, Macpeak & Seas

[57] ABSTRACT

A central station distributes software by telephone. The central station accepts credit card information, transmits an acceptance code to a caller and then terminates the call. After verifying the credit card information, the station calls the purchaser back and continues with the transaction only after receiving the acceptance code. The central station then transmits a Control Transfer Program and Initialization Program to the purchaser, and the purchaser executes the Initialization Program to turn over control of the purchaser computer to the central station. The Control Transfer Program is then executed to transfer first a Protection program for ensuring that no memory resident copying programs are running, than a Storing Program for modifying the purchased program for storage at the purchaser computer, and finally the requested program itself. During the transaction, the various transmitted programs are erased, so that at the end of the transaction only a copy protected version of the purchased program remains on the purchaser's disk.

52 Claims, 3 Drawing Sheets

SOFTWARE DISTRIBUTION SYSTEM

BACKGROUND OF THE INVENTION

The present invention is directed to the sale of computer software and more particularly to a technique for the sale and distribution of software via telephone.

The sale and distribution of software designed for general use is predicated on the assumption that the seller only wishes to sell the right to use the software. The seller specifically does not wish the purchaser to distribute the software to other users. Various methods are employed to accomplish this goal. Since the most common method of distribution is via floppy disk, the purchaser is often restricted by various techniques from either duplicating the floppies or in some cases from using the same floppies on different computers. This results in undesirable side effects.

In the personal computer environment, protection schemes designed to prevent the purchaser from copying the software usually prevent the purchaser from storing the software on hard disk, which would be most convenient. Furthermore, since the software cannot be copied if the floppy disk containing the software is damaged, it must be replaced by the seller. This is often time consuming and always inconvenient. Some sellers have gone to the trouble of including a back up copy of the software along with the original to lessen the inconvenience. Although this is effective in providing a back-up copy, it defeats the seller's desire to prevent proliferation of the software.

Some sellers of general purpose software have avoided software copy protection schemes, instead relying on the honesty of the purchaser, the fact that the documentation can be made difficult to duplicate, and a license agreement which the purchaser is required to honor. The license agreement typically makes it illegal to copy the software or proliferate it by any other means. License agreements are virtually always required by the seller as part of the purchase agreement, regardless of whether the software is protected or not.

Lack of copy protection introduces yet another complexity in the sale and distribution of software. Because software is expensive to purchase, potential buyers would like to examine the software prior to purchase to insure it will perform as expected. Should the software not be copy protected, the seller would not be able to loan the software to a potential purchaser for fear that, if they did like it, they would simply copy it. Thus, non-protected software can only be demonstrated at the seller's location. This can be inconvenient to the potential purchaser who may want a number of people to review the software prior to purchase.

Until now, general purpose software for sale has been primarily distributed on floppy disks, since floppy disks can be readily protected. Software distributed via telephone lines has been typically public domain where protection is not an issue.

There is a need for a technique which will permit copy protection of software distributed by telephone. There is also a need for a technique of efficiently distributing software by telephone, whether the software is copy protected or not.

OBJECTS OF THE INVENTION

It is an object of this invention to provide a means for selling and distributing protected software using standard telephone lines for transferring the software from the seller to the purchaser.

Another object of this invention is to permit the purchaser to rent the protected software for a period of time after which it will self destruct.

Another object of this invention is to permit the purchaser to rent the protected software for a specific number of runs which would be useful, e.g., if the software were a game.

Another object of this invention is to enable any standard software program to be easily altered to accommodate the means for distribution and protection.

Another object of this invention is to provide a simple and rapid means for replacing protected software that has been rendered unusable by virtue of disk damage or inadvertent erasure.

Another object of this invention is to provide a system which has an inherent low cost and simple method of handling software maintenance and updates.

SUMMARY OF THE INVENTION

The invention includes both hardware and software located on the premises of the seller. The hardware in its simplest form comprises a computer with a modem attached to an ordinary telephone line. In a large installation, the seller's computer might be a main frame with many telephone lines and modems. Whatever the size of the installation, the computer and modems are preferably able to support both incoming and outgoing phone calls as well as a variety of baud rates. The computer also contains sufficient memory and disk space to accommodate a library of the software programs available for lease or sale, an index file to permit buyers to browse through the names, brief descriptions and prices for leasing or purchasing of the available software, and the software necessary to perform the requisite tasks.

The requisite tasks of the software include answering phone calls, requesting information from callers, permitting the callers to browse through a catalog of available software, placing phone calls to verify credit card information and purchaser's phone number, transmitting requested software and special programs, and activating the special programs that protect the transmitted software from being proliferated. In addition, certain accounting functions are required of the software to ensure that proper billing and record keeping takes place.

In a preferred embodiment of the invention, the caller is allowed to browse through the available software for some period of time after which he must either request to place an order or hang up. When an order is placed, the caller gives credit card and other payment information, as well as his phone number and the program to be purchased. During this initial call, an acceptance number is transmitted to the purchaser. The central computer hangs up and verifies the credit card information, and then calls the purchaser. At this point, the purchaser must transmit the acceptance number in order to proceed. The central station then transmits to the purchaser an Initialization Program as well as a Control Transfer Program, and then asks the purchaser to execute the Initialization Program, the function of which is to turn control of the purchaser's computer over to the central station via the modem port.

Having taken control of the purchaser's computer, the central station then instructs the purchaser's computer to load and execute the Control Transfer Program for transferring a Primary Protection Program to the purchaser. The purchaser computer then executes the Primary Protection Program, the function of which is to erase everything from memory except for the operating system to ensure there are no memory resident programs which might duplicate the program being purchased. The Primary Protection Program is then erased from memory and the Control Transfer Program is again loaded and executed.

Under control of the Control Transfer Program, a Storing Program and the Target Program (the program being purchased) are transmitted to the purchaser. The Storing Program is a program for modifying the Target Program (the program being purchased) as the latter is being stored on the purchaser's hard disk or floppy disk. The purchaser computer is then instructed to load and execute the Storing Program, whose first task is to check to see if the Storing Program is still located on the disk and, if not, terminate the transaction and render the Target Program unusable. Assuming the Storing Program is still present on the disk the Storing Program now in memory and being executed erases its disk image and then proceeds to modify the Target Program for copy protection.

When copy protection of the Target Program has been completed, the Control Transfer Program and Storing Program are erased from the purchaser computer memory, control is released to the purchaser, and the call is terminated.

BRIEF DESCRIPTION OF THE DRAWINGS

The invention will be more clearly understood from the following description in conjunction with the accompanying drawing, wherein.

GENERAL DESCRIPTION OF THE INVENTION

Figure 1A:
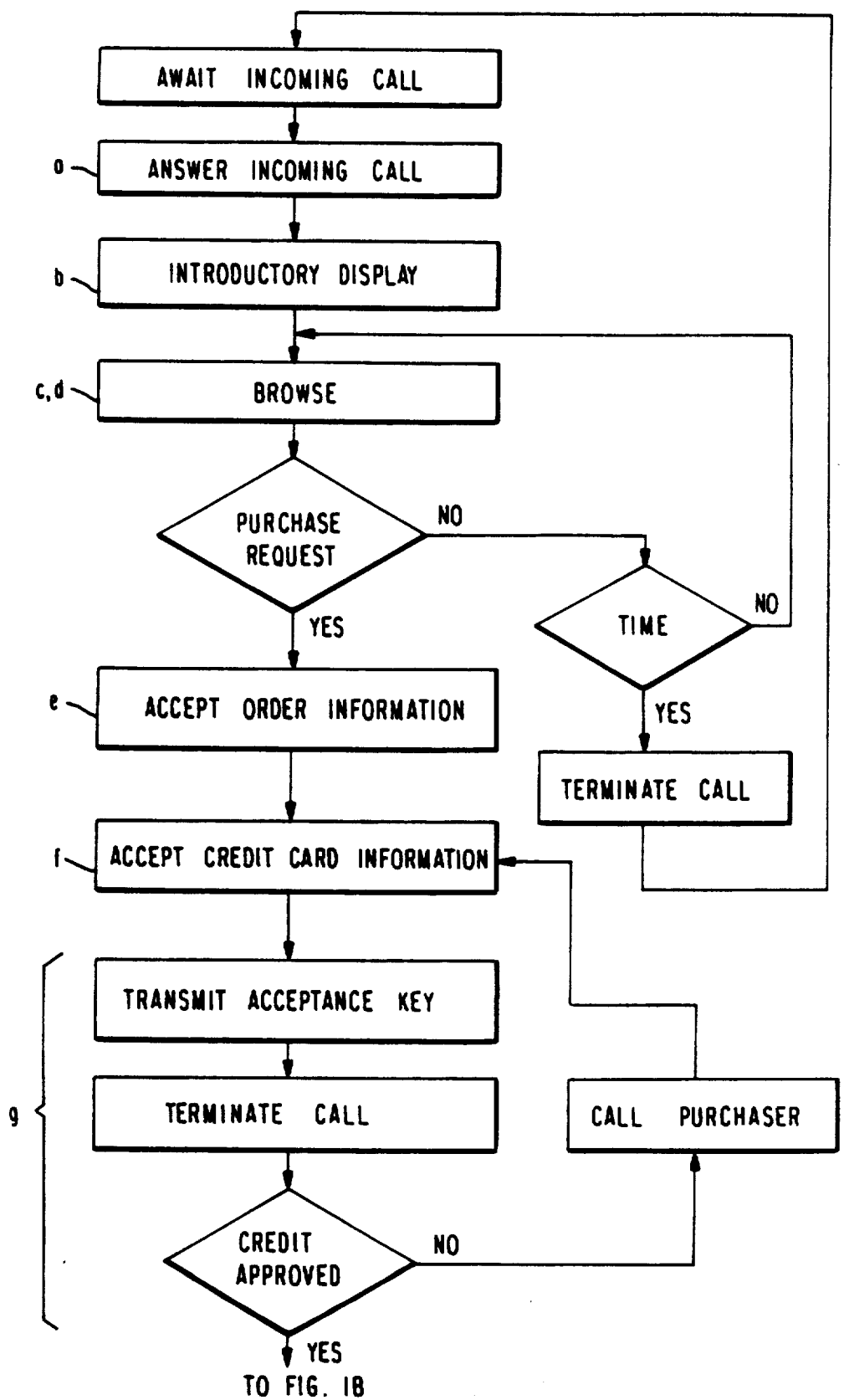
FIGS. 1A and 1B are a flow chart illustrating the sequence of steps in the operation of a preferred embodiment of the invention.

The invention provides a unique system for the protection of software distributed via telephone lines. Prior to this invention, general purpose software for sale has been primarily distributed on floppy disks, since floppy disks can be readily protected. Software distributed via telephone lines has been typically public domain where protection is not an issue.

To protect software distributed on floppy disk, the disk itself must be protected from a standard disk copy routine and the software programs themselves must be copy protected.

Protection from disk copy routines for software stored on floppy disks is based on varying the format of the data recorded on the floppies so as to render them uncopyable by standard software. Popular methods of varying the format include recording on typically unused areas of the floppy disk that normally contain timing or addressing information. To copy a floppy disk so protected, one must first uncover the format of the otherwise uncopyable floppy.

Copy protection of the software programs on either floppy or hard disks can be accomplished by embedding the exact physical location of the software on the disk into the software itself. This is done at the time the software is placed on the disk. When the software is run, it looks to see where it is located and then verifies that this is the position stored in the software. If it is, the software runs normally. If it is not, the software does not run. Of course, an advanced programmer would be capable of reviewing the assembly language code and remove or bypass the test. Breaking of the protect mechanism is a relatively time consuming project and is normally not worth the effort.

Another scheme is used to insure that the software on a floppy disk will only be used on a single machine. The software when first run requests the user to enter the serial number of the computer's operating system. This number is then stored on the floppy disk. Whenever the floppy disk is run, it verifies that the serial number of the computer's operating system is the same as that stored on the floppy disk. Again a clever programmer willing to spend the time and effort to do so can override this scheme.

The present invention incorporates these as well as other methods for protecting the distributed software. When the seller's computer transmits the software to the purchaser's computer it also transmits a Storing Program whose sole purpose is to store the transmitted software on either floppy disk or hard disk depending on the purchaser's desires. As this task is accomplished, the Storing Program copy protects the software. In the preferred embodiment, the Storing Program notes the exact physical location of the software on the disk, the exact time and date the software was stored on the disk, and the serial number of the operating system. The Storing Program then embeds this information into the stored software. When the software is put to use, it will at some point during its operation look for the exact location at which it is stored on disk, the time it was stored and the serial number of the operating system. If these parameters as determined by the software do not agree with those embedded in the software by the Storing Program, the software will either not run or erase itself. The Storing Program's final assignment is to erase itself so that it does not remain on the purchaser's computer. As a final safety feature, failure of the Storing Program to properly operate will leave the software purchased inoperable.

These methods of protecting software will function properly on most computers and with most operating systems. There are more and less complex methods of protecting software each having their own set of trade-offs between added security and reduced performance.

The Storing Program which is used in this invention provides the seller with the ability to transmit protected software over telephone lines. Furthermore, the purchaser can request that the software be placed directly on hard disk, obviating the necessity of having to use a floppy each time the software is run. In addition, should the purchaser damage the disk containing the software or accidentally erase the software, it can be replaced easily and quickly with a phone call. The seller's computer will be programmed to retain lists of all purchases with sufficient data to insure that a request for retransmission does not lead to proliferation. Such information may include (but is not limited to) the serial number of the purchaser's operating system, the specific software sold, the phone number associated with the purchaser's computer and the purchaser's name, address and the number of times the request for retransmission has occurred.

Since the software has been transmitted by telephone lines, purchasers desiring maintenance and updates of the software can be easily accommodated via telephone. Present methods of distribution would by nature require the costly redistribution of floppy disks. With this system in place, it becomes possible to lease software for a prescribed term of use. This would be of great interest to someone wanting to evaluate software prior to purchasing, or to someone who has a limited need to use a very expensive software package. It would also be useful in the area of games or children's software, where the purchaser might be very interested in leasing the software but is not interested in buying the package outright.

The term of use for the leased software can either be a period of time or a number of runs. The specific information can be encryptically stored within the leased software. When leased software is used, the number of runs remaining under lease or a periodic update of the time remaining under lease is encryptically recorded within the program image in memory and on disk. At the conclusion of the term of use, the software renders itself unusable or erases itself from the user's disk.

The invention does not rely on any specific encryption or protection scheme that is repeatedly used. Thus, someone who takes the time to break the protection schemes used would not find his resulting techniques of particular use to anyone else. In other words, if a popular program is leased for three hours and the lessee has the capability and takes the time to uncover how the program is protected from being used for more than three hours, and then devised a method for bypassing this protection scheme, this method would not work on any other leased copy of the same program. The result is that, although there are a few people with the inclination to break protection schemes, their efforts will not be fruitful to others. Furthermore, the time and effort required to break the protection scheme is simply not justified for just one copy of the program.

DETAILED DESCRIPTION OF A PREFERRED EMBODIMENT

The software used in a preferred embodiment of this invention can be divided into seven distinct parts:
1. Interactive Program
2. Database
3. Initialization Program
4. Control Transfer Program
5. Primary Protection Program
6. Storing Program
7. Target Programs.

The functional specifications for these different software parts will each be described, with reference to the flow charts shown in the drawings. Given the functional description which follows herein, the detailed implementation of the programs would be apparent to one of ordinary skill in the art.

1. Interactive Program

Figure 1B:
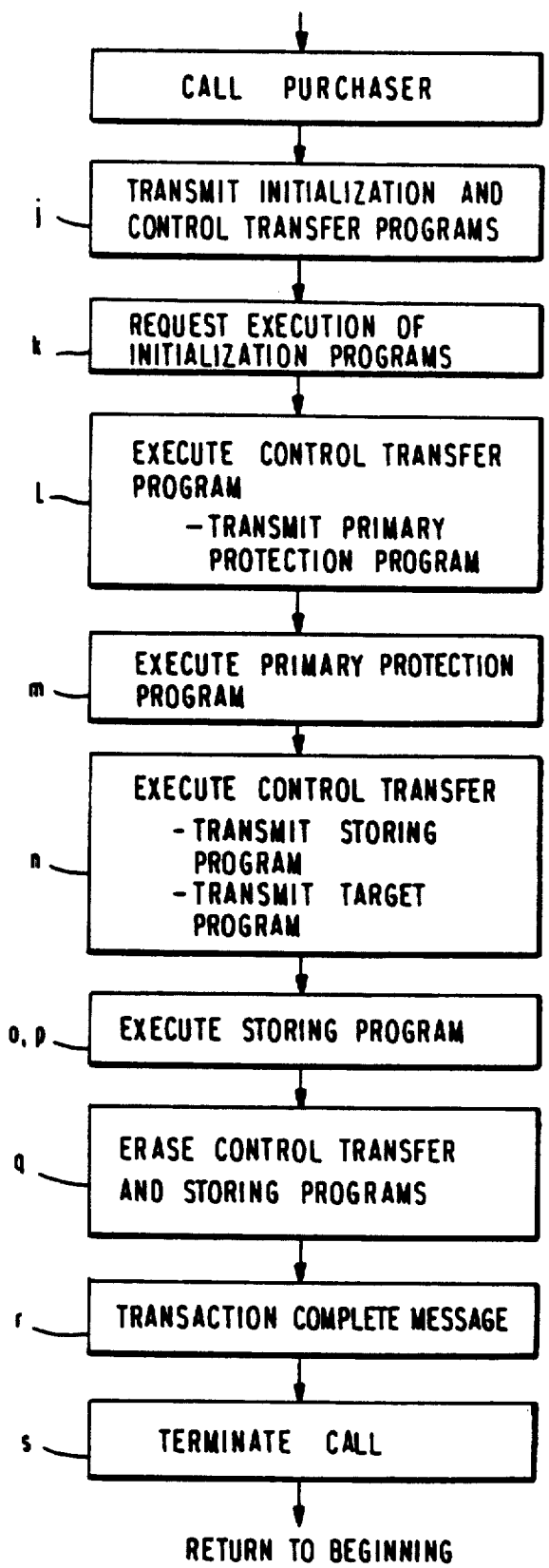

The Interactive Program is located on the Central Computer (seller's computer) and provides all of the functions necessary to complete a transaction with a customer. The following is an example of the steps which may be performed and the order in which they may be performed, with reference to the flow chart of FIGS. 1A and 1B.

a. Answer incoming telephone calls from customers. This begins the process by which a customer can purchase the programs available for lease or sale.

b. Introduce the service by displaying information on the customer's computer. The assumption is that the customer knows nothing about the service and must be walked through the entire process.

c. Permit the customer to browse through the lists of available software via a standard database. Menus are displayed on the customer's monitor (or terminal) to permit the customer to choose which category of software is to be explored. Some categories will have subcategories, etc., from which a selection can be made. Finally, alphabetical lists of the available programs are displayed. For each program, there is a brief description that can be displayed (upon request by the customer) that details some of its attributes and computer requirements.

d. Provide the customer, upon request, with pricing options for lease or purchase of the programs. When a customer finds a program that is a candidate for purchase (lease or sale) a request for pricing information will provide the customer with the available options and their associated costs.

e. Accept sales orders from customer or terminate the phone call. Customers are permitted to browse through the index of available programs for a reasonable period of time. If the Central Computer's phone lines are not busy, this period can be relatively lengthy. At some point in time, however, the customer must either decide to purchase a program or hang up the phone and give other customers an opportunity to access the system.

The Interactive Program keeps tabs on the length of time a customer is browsing and how many phone lines are available for additional customers. When all lines are in use, the program requests browsers that have been connected to the system for a longer period then a predetermined time interval to either make a selection for purchase or terminate their search and recall at a later time to continue. The customer is given a predetermined time interval in which to respond to this request before the central computer disconnects the telephone line.

The Interactive Program must also keep tabs on browsers who are not interacting with the central computer. This is accomplished by monitoring the amount of time since the last intelligent request from the customer. Should this time interval exceed a predetermined time interval, it will be taken to mean that the customer is no longer at his or her computer and the phone call should be terminated. Thus, a customer either selects a program to purchase, terminates the connection as a result of not finding anything of interest, or runs out of time and is disconnected.

f. Request and record the customer's name, address phone number and credit card to be charged for the order. Once a program is selected for purchase, the Interactive Program must make sure that the customer is able to pay for the purchase. To accomplish this, credit card information as well as customer information must be provided by the customer. The credit card used for the purchase must belong to the customer, and the address and phone number given by the customer must be the same as that to which the purchase is to be delivered. Although the credit card information can be easily checked, the accuracy of the phone number and address as it relates to the owner of the credit card is not readily available. In principle, one can place the entire telephone directory on the Central Computer for verification purposes. This would enable verification of all but the newest telephone subscribers. As will be discussed later, other methods are used to prevent theft.

g. Provide acceptance key, terminate incoming call, obtain credit card approval for the sale and recall the customer. The purpose of terminating the call and then recalling the customer is twofold. First, it limits the number of telephone lines tied up simultaneously with a given customer to one. Second and most important, the central computer can record the phone number to which the purchase is delivered and provide the customer with an acceptance key. When the customer is recalled, the acceptance key is requested to insure that the correct party has been reached. A correct response must be given before the program is transferred. Should collection difficulties occur later, the Central Computer will have the phone number that received the program and provided the acceptance key. Credit card approval is achieved by techniques presently in use.

The above describes the basic operation for non business customers. Business customers will be requested to follow a somewhat different scheme. When a customer calls in to the central computer, the answers to the questions posed will reveal that a business is about to purchase programs. Businesses are encouraged to set up standing or limited purchase orders to permit personnel within their organization to utilize this service without the use of credit cards. At the time the purchase order is set up, the business customer receives a set of acceptance keys that its personnel may use when ordering programs against a specific purchase order, and the Central Computer receives a set of phone numbers to which programs may be delivered when billed against the purchase order. Businesses will be encouraged to use purchase orders rather than credit cards by providing purchase order discounts. When a business customer selects a program for purchase, the central computer requests the phone number to which the program is to be sent. When that number is called, the central computer requests an acceptance key. The acceptance key and called number must coincide with a specific purchase order for the software to be transferred. At the end of each month, the business customer is provided with a list of used acceptance keys, programs purchased, and charges. Since the acceptance keys can only be used once, the business can control the purchases being made and keep track of which employees made purchases as well as what programs were purchased.

h. The Interactive Program checks that the number dialed reached the customer. If a wrong number was reached, it redials and reverifies. Should the second attempt fail, the information is recorded for later review and the transaction is terminated. Determination of the correct number having been reached is ascertained by two factors. First, there should be a modem on the line. Second, the responder to the phone call must provide the correct acceptance key.

i. Upon reaching the customer, the transaction is continued if the credit card was approved for the sale amount. If not, an alternate credit card is requested. Upon submission of an alternate credit card, the program returns to step (g) and continues. If no alternate credit card is available, the transaction is terminated. A record must be kept of the unapproved credit cards to prevent the customer from continuing the process with two or more unapproved credit cards. Once a customer provides an already unapproved credit card, the routine can be terminated.

j. If the transaction continues, the Initialization Program and Control Transfer Program are transmitted to the customer with a message that appears on the customer's terminal requesting the customer to execute the Initialization Program after first removing any programs resident in memory. The reason for requesting the removal of any programs resident in memory on the customer's computer is to prevent their erasure and potential loss of valuable information as will become more clear below.

k. The Interactive Program on the central computer takes control of the customer's computer as the "user" at the completion of the Initialization Program. The Initialization Program transfers control to the central computer by designating the modem port as the console. After the Initialization Program is executed, the keyboard is deactivated. All subsequent commands will be entered from the modem port.

l. Execute the Control Transfer Program and transmit the Primary Protection Program to the customer's computer. The rationale for providing a special transfer program to receive the programs is to prevent the customer from using a transfer program that could make multiple copies of the transmitted programs. e.g., on floppy disks and hard disks.

m. Execute the Primary Protection Program and erase it from the customer's computer when it has completed its tasks. The Primary Protection Program is erased, since it's only purpose is to protect against certain types of theft. The less known about these programs the better are the chances that their action will not be defeated.

n. Execute the Control Transfer Program and transmit the Storing Program and the Target Program to the customer's computer. This is done once the Primary Protection Program has been run and there is reasonable assurance that neither of these programs can be copied without authorization.

o. Execute the Storing Program. Upon execution of the Storing Program, a series of protection mechanisms are invoked that will prevent the unauthorized use of the Target Program after control of the customer's computer is returned to the customer.

p. Interact with the Storing Program while it is completing its tasks, providing it with requested information to secure the Target Program. This step may or may not be used depending on whether the Storing Program is preprogrammed with the detailed information needed. This information includes the leasing arrangement, the specifics for copy protection and encryption, and the medium for final storage of the Target Program (hard disk or floppy disk). as this will influence the types of protection employed.

q. Erase the Control Transfer Program and the Storage Program from the customer's computer. At this point these programs are no longer needed.

r. Send a message of the satisfactory completion of the transfer of the Target Program to the customer's monitor or terminal. Describe how to execute the program and return control of the customer's computer to the customer. At this point the transfer of the purchased program has been completed.

s. The telephone call is terminated, the sale billed to customer's credit card and some internal information is recorded at the central computer for accounting purposes 2. Database The Database contains an index file of all available Target Programs for lease or purchase. This index is accessible by customers who telephone into the central computer. It also contains pricing information, approximate time to transfer and a brief description of each Target Program.

The Database is organized by category, such as games, spread sheets, word processors, etc. Subcategories may exist, e.g., under games one might expect to find: mystery, adventure, learning, etc. The customer has the capability to move freely across categories and subcategories until a desired Target Program is located. Once a desired program is found, the customer can request to review a brief description of the Target Program, the cost for lease or purchase and the approximate transfer time. If the customer wishes to make a sale, the Interactive Program takes over and continues the dialogue with the customer.

3. Initialization Program

The Initialization Program is transferred to the customer's computer by the Interactive Program. It has the task of converting the modem port into the console and informing the central computer when this has been accomplished. In this manner, the central computer can take over operating the customer's computer for the purpose of transferring the Target Program to the customer. The customer is requested to remove any programs that are resident in memory and running in a background mode (such as a calendar program), as they will be erased by the Primary Protection Program. The customer is sent a message to execute the Initialization Program once any programs resident in memory are removed.

4. Control Transfer Program

The Control Transfer Program is a standard program used with modems to transfer files from one computer to another over telephone lines. It is used in place of the customer's Transfer Program to insure that no unauthorized copies of the transferred files are stored during transfer from the central computer.

5. Primary Protection Program

The main purpose of the Primary Protection Program is to insure that there are no programs in memory running in the background that might be used to produce an unauthorized version of the Target Program or the Storing Program. It accomplishes this by writing over the entire memory save the operating system and itself. Once this is completed, it informs the central computer that its task is completed.

6. Storing Program

Figure 2:
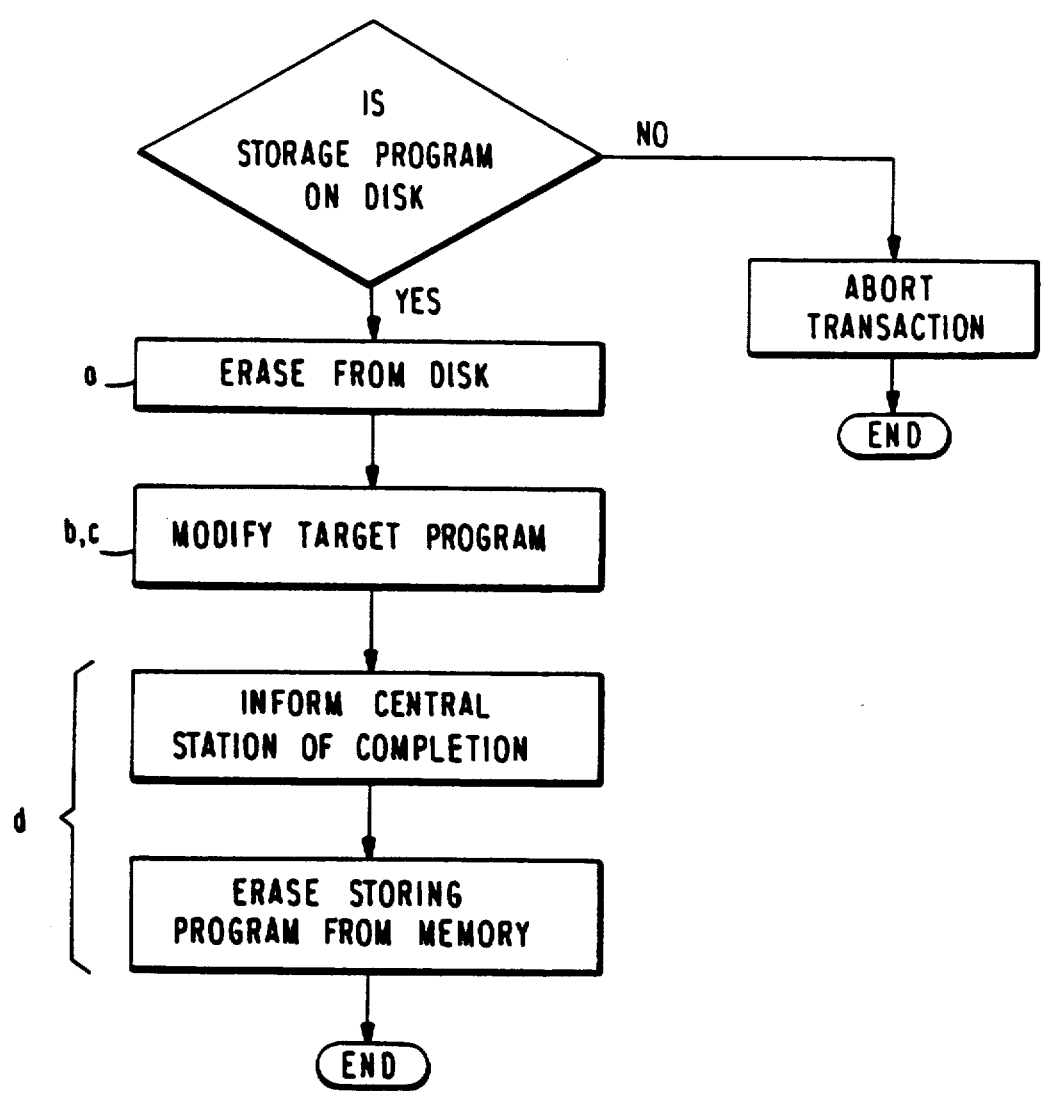
FIG. 2 is a flow chart illustrating the operation of the Storing Program used in the preferred embodiment.

The Storing Program performs a number of tasks. One example of these tasks and a suitable order for their performance is as follows, with reference to the flow chart of FIG. 2.

a. It erases its own image on disk. This is done to prevent the customer who is storing files on floppies from removing the floppy with the Storage Program on it. It first verifies that the Storage Program is on the disk and then erases it. Should it not find the Storage Program on the customer's disk, the central computer is notified, the sale is terminated and remedial actions are taken.

b. The Storing Program modifies the Target Program to make it uncopyable and protect its unauthorized use. A variety of methods are used. These will be discussed elsewhere. The actual protection schemes used are not unique. However, a unique feature of this invention is that each time a Target Program is modified, the exact method of protection is varied so that if someone breaks one of the protection schemes the method devised will not work on any other Target Program. Thus, published schemes for unprotecting Target Programs will be of little benefit to others. One example of how the modification can be varied is to use a somewhat different encryption scheme each time a Target Program is protected.

c. The central computer is contacted to determine if the Target Program is to be leased or purchased. An alternative to this contact could be accomplished by preprogramming the Storing Program with this information prior to transferring it to the customer's computer. If leased, the details of the lease arranged are passed onto the Storing Program so that they may be incorporated into the Target Program. This information is encrypted by the Storage Program and placed in the Target Program. Each time the Storage Program performs one of these encryptions it varies the scheme.

d. Finally, the Storing Program informs the central computer that all tasks are completed and ends by erasing its own image from memory or has its image in memory and on disk erased by the Interactive Program acting as the user.

7. Target Programs

The Target Programs are the various software packages available for lease or purchase. They must be modified by the Storage Program to be properly executable.

Hardware Requirements

The hardware in this invention comprises computers, modems and telephone lines.

1. Computer Hardware

The computer can be as simple as an IBM PC or as complex as a mainframe. The hardware requirements are that the computer must be capable of utilizing modems, have a large rapid access storage capacity (e.g., a hard disk), meet the processing power requirements and have the ability to back up stored files.

2. Modem Requirements

The modems should have the ability to automatically alter their data rate to accommodate the customer's modem. The central computer modems should be able to accommodate customer modem data rates from 300 to 9600 baud.

The central computer modems should also have the capability of busying out the telephone lines when the customer is off line. This can be accomplished either automatically when the modem senses the state of the computer, or mechanically by an operator.

The modems should be of the type which places the telephone lines in a busy state should a power failure occur.

3. Computer Customer Capacity and Response Time

The computer's customer capacity and response time must be sufficient to handle a prespecified number of customers simultaneously.

The number of customers that can be handled simultaneously regardless of response time will depend on the number of modems that can be put into use.

The response time will depend on the following hardware considerations: the speed of the processor, the number of wait states, the hard disk average access time, the size of the memory and the baud rate of the customer's modem.

As the number of simultaneous customers increases, the response time will increase. Since response time is a subjective criteria there will be a broad latitude of acceptable times depending on the customer's experience. Furthermore, customers with low baud rate modems will be less likely to notice longer response times than customers with high speed modems.

The specific software and operating system in use on the central computer will also affect response time.

4. Computer Storage Capacity

The storage capacity must be sufficient to accommodate all of the programs required to interact with the customer and complete a sale, the database, and one each of the complete stock of Target Programs for sale. If accounting and billing are to be performed on this computer, their programs and data files must also be included in determining the required storage capacity. Hard disks with 40 megabyte capacity should be sufficient to meet the needs of most installations. Such disks are readily available at reasonable prices for use with PCs.

As the number of Target Programs required to be stored on the central computer grows, it may become necessary to add a second disk or replace the first disk with one of greater capacity.

5. Backup Facilities

Although not absolutely necessary, backup capability is highly desirable. Backup can be provided on floppy disks, but tapes are preferred because of the speed advantage. Because of the importance of keeping duplicate records of accounting and billing files, backup procedures must be invoked on a regular basis during each work day. Streaming tape drives will minimize the time required to perform this operation.

6. Use of Multiple Computers

The central computing facility can be composed of several small computers each supporting a group of telephone lines and modems. Although such a configuration typically implies redundant storage capacity, there are some benefits to be gained.

One advantage is that the computers act independently of one another. Thus, a failure of one computer does not shut down the central computer's operation. The business can continue to operate, albeit at a reduced customer capacity.

A second advantage is that the use of multiple computers each with its own hard disk will improve response time to the customer. Experience has shown that the major bottleneck in multi-tasking systems that are providing services and information is average disk access time. Since there is little number crunching involved in these type of applications, the ultimate response time limitation of the computer results from limited memory size which translates into the necessity of reading information from disk onto memory or writing information from memory onto disk more often than is desirable. By providing multiple systems each with their own hard disk, this slow task is distributed among many disks. It should be noted that an alternative method would be to put multiple hard disks on one computer. This would clearly improve response time if the software designers distributed the files properly across the disks so that they were all exercised when dealing with a customer.

Another advantage of multiple computers is the ease with which the central computing facility can be expanded to handle increased numbers of customers.

Another advantage is that individual computers could be taken off line for routine maintenance without shutting down the entire operation. New Target Programs could be added off line. Bugs could be repaired one computer at a time.

The multiple computers can be tied together in a local area network which would make it possible for a single computer to provided all of the accounting and billing functions.

To accommodate a multiple computer central facility, the incoming telephone lines should be ordered in a single hunt group. When a specific computer is taken off line, the modems associated with that computer must busy out the telephone lines. In this manner, incoming calls will be routed past the off-line computer to those that are on-line.

It is also advisable in a multiple computer facility to arrange the physical location of the telephone lines and modems on the computers so that as the customers call in the load is distributed across all of the computers. This can be done in a rudimentary manner by assigning the first incoming call to the first computer, the second to the second computer, etc. until all the computers are in use. This process is then repeated until all incoming lines are in use. More sophisticated methods of automatic call distribution are available as standard off-the-shelf equipment.

Operating System Requirements

The operating system must be able to support multi-tasking or be readily altered to permit multi-tasking software and multiple ports to be serviced. Standard operating systems for single-user computers such as MS-DOS and CPM are so alterable. Other systems such as Xenix are designed to support multi-tasking.

Since the operating system can have a substantial impact on response time, any system considered should be evaluated for this criteria.

Telephone Interface Requirements

The computer must interface to a group of telephone lines via modems. The modems may be located within the computer itself or be external devices. The computer must be able to dial both local and long distance phone numbers using the modems. The long distance calls may require the use of special access codes to utilize low cost carriers.

The invention makes it possible to put protected software directly onto a hard disk obviating the need to read from a floppy ever time the program is run. This has been a major drawback in using programs distributed on floppies.

The invention also provides a means for leasing software as well as purchasing it. In many applications this will become the preferred method of sale. As for example, for children's games, or software that is not often used.

Finally, and most importantly, the invention provides a means of selling copy-protected software via telephone, eliminating the need for a store front to exhibit and demonstrate the available programs. This means low overhead and subsequently lower prices.

While a preferred embodiment of the invention has been described above, there are obviously many changes which could be made to various aspects of the preferred embodiment while still practicing the invention. For example, instead of obtaining payment through either credit card or by invoice as described above, the system could be designed so that, during execution of the control transfer program, the requester equipment would call the central computer on a "900" number and hold the line for a duration corresponding to the cost of the purchased software. The purchaser would then pay for the software via his phone bill.

In addition, both the central computer and control transfer program could advantageously be provided with some means for recognizing when a transmission has terminated before completion. This feature would have at least two important applications. First, the system could be programmed to re-initiate the call to complete the transaction at minimum inconvenience to the customer. Re initiation could be accomplished from either the central computer or the purchaser's computer under the control of the control transfer program. Even more importantly, if a the call is terminated prior to the end of transmission of the purchased program, the purchaser's computer would retain the control transfer program in memory and would have the storing program on disk, thereby potentially compromising the security of the system. The control transfer program could be designed to erase itself and the storing program if any key on the purchaser's computer is pressed, or if no data is received over the phone line for some predetermined period of time, e.g., 10 seconds.

Also, the system may be designed to complete all parts of the transaction except for the program transmission, and the purchaser may be instructed to leave his computer in an answer mode at night so that the central computer can call back during off-peak ours when telephone rates are lower.

A further alternative would be to perform at least a substantial portion of the encryption of the target program at the central station. For example, the system at the central station may encrypt the target program according to a different algorithm each time a target program is transmitted, with the Storing Program then merely storing the encrypted program on disk. Alternatively, the portion of the encryption which changes from one transmission to the next may be performed at the central station, with the storing program completing the encryption but using the same algorithm each time for its portion of the encryption, e.g., inserting into the encrypted target program information which indicates the location of the target program on the disk.

A distinctive feature of the present invention is that, when a purchaser requests the transmission of a target program, the central station transmits a program in addition to the target program which is to be executed before or during the transmission of the target program to prevent unauthorized reception, execution, copying, etc. (collectively referred to as "unauthorized use") of the target program. However, rather than transmitting the "additional" program (e.g., the primary protection program, control transfer program and/or storing program) separately from the target program, a single program may be transmitted which contains both, i.e., the target program material may be embedded within a larger program which is designed to perform its transfer functions and then erase itself leaving only the target program on the purchaser's disk. This would, in effect, still constitute the sending of two different programs and would still satisfy the language of the appended claims requiring the transmission of a program in addition to the target program.

It will be appreciated that various additional changes and modifications may be made to the preferred embodiment described above without departing from the spirit and scope of the invention as defined in the appended claims.

We claim:

1. A method of transferring software from a central station to requester equipment in communication with said central station over a communications link for storage at said requester equipment, said method comprising the steps of receiving a request for a particular program, transmitting said particular program to said requester equipment and interrupting said communications link, said method further comprising the steps of: transmitting executable program material to said requester equipment in response to communication from said requester equipment to said central station and in addition to said particular program; and executing at least a portion of said additional program material at said requester equipment prior to interruption of said communications link to prevent unauthorized use of said particular program.

2. A method as defined in claim 1, wherein said step of transmitting said additional program material is performed prior to said step of transmitting said particular program.

3. A method as defined in claim 1, wherein said additional program material and said particular program are transmitted together as parts of a single composite program.

4. A method as defined in claim 1, wherein said step of executing said additional program material is performed at least prior to or during said step of transmitting said particular program material.

5. A method as defined in claim 1, further comprising the step of modifying said particular program prior to transmitting said particular program to said subscriber equipment.

6. A method as defined in claim 5, wherein said step of modifying said particular program comprises adding copy protection to said program.

7. A method as defined in claim 5, wherein said step of modifying said particular program comprises modifying said particular program so that it can be executed only a predetermined number of times.

8. A method as defined in claim 5, wherein said step of modifying said particular program comprises modifying said particular program so that it may be used for only a predetermined period of time.

9. A method as defined in claim 7, wherein said step of modifying said particular program further comprises modifying said particular program so that the central station can later modify said particular program to permit a desired amount of further use of said particular program at said requester equipment.

10. A method as defined in claim 8, wherein said step of modifying said particular program further comprises modifying said particular program so that the central station can later modify said particular program to permit a desired amount of further use of said particular program at said requester equipment.

11. A method as defined in claim 5, wherein said particular program is modified in a different manner for different transmissions of the same program.

12. A method as defined in claim 11, wherein said particular program is modified in accordance with a different algorithm for different transmissions of the same program.

13. A method as defined in claim 1, wherein said step of transmitting said program material to said requester equipment in addition to said particular program comprises transmitting at least a first program, and wherein said step of executing said additional program material comprises executing at least said first program prior to transmitting said particular program to said requester equipment.

14. A method as defined in claim 13, wherein said first program comprises an initialization program which, when executed by said requester equipment, permits said requester equipment to be controlled by said central station.

15. A method as defined in claim 13, wherein said first program comprises a program for modifying said particular program for storage of said particular program at said requester equipment.

16. A method as defined in claim 15, wherein said first program modifies said particular program in accordance with an algorithm, said method further comprising the step of changing said algorithm for different transmissions of the same particular program.

17. A method as defined in claim 13, wherein said first program comprises a transfer program for transferring said particular program from said central station to said requester equipment.

18. A method as defined in claim 13, wherein said step of transmitting at least a first program comprises transmitting at least first and second programs to said requester equipment, and said step of executing at least said first program comprises first executing said first program and then executing said second program prior to transmitting said particular program to said requester equipment.

19. A method as defined in claim 18, wherein said first program comprises a program for permitting said requester equipment to be controlled by said central station and said second program comprises a program for controlling transfer of said particular program from said central station to said requester equipment.

20. A method as defined in claim 13, further comprising the step of transmitting a second program to said requester equipment after execution of said first program, and executing said second program during or after transmission of said particular program to said requester equipment.

21. A method as defined in claim 20, wherein said first program comprises a program for controlling transfer of said particular program from said central station to said requester equipment and said second program comprises a program for modifying said particular program for storage at said requester equipment.

22. A method as defined in claim 13, wherein said requester equipment includes at least one volatile memory for storing programs during execution thereof and at least one non-volatile storage means, wherein said first program comprises a program for controlling transfers from said central station to said requester equipment when executed, said method further comprising the steps of:
transmitting a second program to said requester equipment during execution of said first program, said second program comprising a program for modifying said particular program for storage of said particular program on said non-volatile storage means; and
executing said second program.

23. A method as defined in claim 22, further comprising, erasing a portion of said volatile memory prior to said step of executing said first program.

24. A method as defined in claim 22, wherein said first program is stored on said non-volatile storage means during said step of transmitting said program material to said requester equipment, said method further comprising erasing said first program from said non-volatile storage means prior to said step of transmitting said second program.

25. A method as defined in claim 14, wherein said step of transmitting said at least first program comprises transmitting said first program as well as a second program for controlling transfers from said central station to said requester equipment, said method further comprising the steps of:
executing said second program at said requester equipment prior to transmitting said particular program;
transmitting a third program to said requester equipment during execution of said second program; and
executing said third program.

26. A method as defined in claim 25, wherein said third program comprises a program for modifying said particular program for storage at said requester equipment.

27. A method as defined in claim 25, wherein said requester equipment includes at least one volatile memory for storing programs during execution thereof and at least one non-volatile storage means for storing at least said second and particular programs upon receipt of said programs from said central station, said method comprising, during execution of said second program, the step of erasing said second program from said non-volatile storage means.

28. A method of transferring software from a central station to requester equipment in communication with said central station over a communications link for storage at said requester equipment, said method comprising the steps of:
receiving a request for a particular program;
transmitting an acceptance code to said requester equipment;
interrupting said communications link between said central station and said requester equipment;
reestablishing said communications link from said central station;
requesting an acceptance code from said requester equipment;
receiving an acceptance code at said central station from said requester equipment;
comparing the received acceptance code to the code transmitted to said requester; and
transmitting said particular program to said requester equipment after verifying that the received and transmitted acceptance codes are the same.

29. A system for transferring software from a central station to requester equipment in communication with said central station over a communications link for storage at said requester equipment, said system comprising:
means at said central station for receiving a request for a particular program;
means at said central station for transmitting executable program material from said central station to said requester equipment in response to communication from said requester equipment to said central station and in addition to said particular program; and
means for initiating execution of said program material by said requester equipment to prevent unauthorized use of said particular program.

30. A system as defined in claim 29, wherein said program material includes at least a first program which is transmitted to said requester equipment prior to transmission of said particular program and is executed by said requester equipment prior to transmission of said particular program.

31. A system as defined in claim 30, wherein said first program comprises an initialization program which, when executed by said requester equipment, permits said requester equipment to be controlled by said central station.

32. A system as defined in claim 30, wherein said first program comprises a program for modifying said particular program for storage of said particular program at said requester equipment.

33. A system as defined in claim 32, wherein said first program modifies said particular program in accordance with an algorithm, said system further comprising means for changing said algorithm for different transmissions of the same particular program.

34. A system as defined in claim 29, further comprising means for modifying said particular program prior to transmitting said particular program to said requester equipment.

35. A system as defined in claim 34, wherein said particular program is modified in a different manner for different transmissions of the same program.

36. A system as defined in claim 35, wherein said particular program is modified in accordance with a different algorithm for different transmissions of the same program.

37. A system as defined in claim 30, wherein said first program comprises a transfer program for transferring said particular program from said central station to said requester equipment.

38. A system as defined in claim 30, wherein said means for transmitting said executable program material comprises means for transmitting at least said first program and a second program to said requester equipment, and said means for initiating execution of said program material comprises means for first initiating execution of said first program by said requester equipment and for then initiating execution of said second program by said requester equipment prior to transmitting said particular program to said requester equipment.

39. A system as defined in claim 38, wherein said first program comprises a program for permitting said requester equipment to be controlled by said central station and said second program comprises a program for controlling transfer of said particular program from said central station to said requester equipment.

40. A system as defined in claim 30, further comprising means for transmitting a second program to said requester equipment after execution of said first program, and means for initiating execution of said second program by said requester equipment during or after transmission of said particular program to said requester equipment.

41. A system as defined in claim 40, wherein said first program comprises a program for controlling transfer of said particular program from said central station to said requester equipment and said second program comprises a program for modifying said particular program for storage at said requester equipment.

42. A system as defined in claim 30, wherein said requester equipment includes at least one volatile memory for storing programs during execution thereof and at least one non-volatile storage means, wherein said first program comprises a program for controlling transfers from said central station to said requester equipment when executed, said system further comprising:
means for transmitting a second program to said requester equipment during execution of said first program, said second program comprising a program for modifying said particular program for storage of said particular program on said non-volatile storage means; and
means for executing said second program.

43. A system as defined in claim 42, further comprising means for erasing a portion of said volatile memory prior to execution of said first program.

44. A system as defined in claim 42, wherein said first program is stored on said non-volatile storage means during transfer of said first program to said requester equipment from said central station, said system further comprising means for erasing said first program from said non-volatile storage means prior to transmission of said second program.

45. A system as defined in claim 31, wherein said means for transmitting said program material comprises means for transmitting said first program as well as a second program for controlling transfers from said central station to said requester equipment, said system further comprising:
means for executing said second program at said requester equipment prior to transmitting said particular program;
means for transmitting a third program to said requester equipment during execution of said second program; and
means for executing said third program.

46. A system as defined in claim 45, wherein said third program comprises a program for modifying said particular program for storage at said requester equipment.

47. A system as defined in claim 45, wherein said requester equipment includes at least one volatile memory for storing programs during execution thereof and at least one non-volatile storage means for storing at least said second and particular programs upon receipt of said programs from said central station, said system comprising means for erasing said second program from said non-volatile storage means during execution of said second program.

48. A system for transferring software from a central station to requester equipment in communication with said central station over a communications link for storage at said requester equipment, said system comprising:
means for receiving a request for a particular program;
means for transmitting an acceptance code to said requester equipment;
means for interrupting said communications link between said central station and said requester equipment;
means for reestablishing said communications link from said central station;
means for requesting an acceptance code from said requester equipment;
means for receiving an acceptance code at said central station from said requester equipment;
means for comparing the received acceptance code to the code sent to said requester; and
means for transmitting said particular program to said requester equipment after verifying that the received and transmitted acceptance codes are the same.

49. A method as defined in claim 1, wherein said communication from said requester equipment to said central station comprises said request for said particular program.

50. A system as defined in claim 29, wherein said communication from said requester equipment to said central station comprises said request for said particular program.

51. A method as defined in claim 1, wherein said step of executing said additional program material comprises executing at least a portion of said additional program material after receipt by said central station of said request for said particular program.

52. A system as defined in claim 29, wherein at least a portion of said program material is executed by said requester equipment after receipt by said central station of said request for said particular program.

* * * * *